US007482583B2

(12) United States Patent
Ueno

(10) Patent No.: US 7,482,583 B2
(45) Date of Patent: Jan. 27, 2009

(54) TIME OF FLIGHT MASS SPECTROMETER

(75) Inventor: Yoshihiro Ueno, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 177 days.

(21) Appl. No.: 11/603,159

(22) Filed: Nov. 22, 2006

(65) Prior Publication Data

US 2007/0114383 A1 May 24, 2007

(30) Foreign Application Priority Data

Nov. 24, 2005 (JP) ............................. 2005-338593

(51) Int. Cl.
*B01D 59/48* (2006.01)

(52) U.S. Cl. ....................... 250/287; 250/281; 250/282; 250/297; 250/298; 250/291

(58) Field of Classification Search ................. 250/281, 250/282, 287, 297, 298, 291
See application file for complete search history.

(56) References Cited

U.S. PATENT DOCUMENTS 6,949,738 B2 * 9/2005 Yamaguchi et al. ......... 250/287

FOREIGN PATENT DOCUMENTS

| | | | |
|---|---|---|---|
| JP | 11-195398 | A | 7/1999 |
| JP | 2000-243345 | A | 9/2000 |
| JP | 2000-243346 | A | 9/2000 |
| JP | 2003-86129 | A | 3/2003 |

OTHER PUBLICATIONS

Hisashi Matsuda, "Improvement of a TOF Mass Spectrometer with Helical Ion Trajectory," vol. 49 No. 6 2001 pp. 227-288.
Hasashi Matsuda, "Spiral Orbit Time of Flight Mass Spectrometer" J. Mass Spectrom. Soc. Jpn., vol. 48 No. 5 2000, pp. 303-305.
T. Satoh et al., "Construction of time-of-flight mass spectrometer with spiral ion trajectory", The 53rd Annual Conference on Mass Spectrometery 2005, pp. 30-31.

* cited by examiner

*Primary Examiner*—Jack I Berman
*Assistant Examiner*—Michael Maskell
(74) *Attorney, Agent, or Firm*—Westerman, Hattori, Daniels & Adrian, LLP.

(57) ABSTRACT

In a time of flight mass spectrometer (TOFMS) having a flight space in which ions fly in a loop orbit formed by a plurality of electric sector fields, the present invention provides a simple structure that creates a spiral path by deflecting the ions in the axial direction of the electric fields at every turn of the ions. In a mode of the present invention, the TOFMS has cylindrical electrodes 11 and 12 for creating electric sector fields E1 and E2, between which a parallel pair of planer magnetic poles 15*a* and 15*b* are provided. The planer magnetic poles 15*a* and 15*b* create a deflecting magnetic field B1 for shifting the ions in the axial direction (Y-direction) of the electric sector fields. The ions experience a Lorenz force once every turn when they pass through the deflecting magnetic field B1. This construction uses only one pair of magnetic poles facing each other across the ion path P to deflect every ion irrespective of its number of turns. There is no need to provide one deflector for each turn of the ions, as in the case of conventional TOFMSs.

18 Claims, 4 Drawing Sheets

TIME OF FLIGHT MASS SPECTROMETER

The present invention relates to a time of flight mass spectrometer. More specifically, it relates to a time of flight mass spectrometer comprising plural electric sectors for making ions fly along a loop orbit.

BACKGROUND OF THE INVENTION

In general, a time of flight mass spectrometer (TOFMS) accelerates ions by an electric field to a certain level of kinetic energy and injects them into a flight space having a specific flight distance. In the flight space, the ions are separated by their mass-to-charge ratios according to the time of flight (or "flight time") until they are detected by a detector. The difference in the flight time of two ions having different mass-to-charge ratios is larger as the flight distance is longer. Therefore, it is possible to enhance the mass resolution by making the flight distance longer. However, conventional types of TOFMSs (e.g. a linear type, reflectron type and so on) have physical restrictions (e.g. the limited overall size) that limit their flight distance.

To solve this problem, some of the recently proposed TOFMSs have multi-turn structures. For example, the TOFMS disclosed in Patent Document 1 has an elliptic loop orbit formed by plural toroidal electric sector fields and makes ions repeatedly fly in that orbit multiple times to increase the flight distance. According to this construction, as the ion makes a larger number of turns along the loop orbit, the flight distance increases and the total flight time becomes accordingly longer. Therefore, the mass resolution increases with the increase in the number of turns of the ion. However, the above-described construction has a problem in that an ion having a smaller mass-to-charge ratio and flying at an accordingly higher speed may overtake another ion having a larger mass-to-charge ratio while they are repeatedly flying in the same loop orbit.

To avoid this problem, Patent Document 2 proposed a TOFMS, in which ions do not repeatedly fly in the same loop orbit but follow a spiral flight path, with their orbits gradually shifting at every turn. This TOFMS includes six pieces of electric sector fields arranged to form a hexagonal flight space through which ions can circuit. It also has a deflecting electric field located between a pair of neighboring electric sector fields. When an ion passes through one of the deflecting electric fields, the electric field shifts the ion in the axial direction of the electric sector field. While the ion is flying through the spiral path, its point of arrival gradually changes along the axial direction of the electric sector fields. Therefore, it is possible to appropriately determine the release point of each ion within a electric sector field so that the ion makes a desired number of turns before it reaches the detector.

To shift the flight path of the ions in the axial direction of the electric sector fields, the above-described mechanism needs multiple pairs of parallel plate electrodes to respectively create a deflecting electric field for each turn of the ions. This means that it requires N−1 pairs of parallel plate electrodes if the ions should turn N times. Such a construction becomes more complex as the number of turns N is increased in order to make the flight path longer. One possible method for simplifying the construction is to employ only one pair of parallel plate electrodes for creating a deflecting electric field that is shared by all the levels of the flight path. However, this construction cannot produce an adequate strength of electric field whose equipotential lines are uniformly distributed across the flight space. As a result, the ions can not follow the ideal deflection path and the performance deteriorates.

[Patent Document 1] Unexamined Japanese Patent Publication No. H11-195398

[Patent Document 2] Unexamined Japanese Patent Publication No. 2003-86129

To solve the above-described problem, the present invention intends to provide a time of flight mass spectrometer having a loop-shaped flight space formed by plural pieces of electric sector fields, which has a simple structure and yet ensures a high level of mass-separation performance by deflecting ions in an appropriate way.

SUMMARY OF THE INVENTION

Thus, the present invention provides a time of flight mass spectrometer having an ion optics system including plural pieces of electric sector fields arranged to form a loop-shaped flight space within which ions can turn multiple times, which includes a magnetic field generator for creating a deflecting magnetic field between a pair of neighboring electric sector fields, so that the deflecting magnetic field shifts the flight path of the ions in the axial direction of the electric fields when the ions pass through the deflecting magnetic field.

In a mode of the present invention, the magnetic field generator consists of a pair of planar magnetic poles arranged parallel to each other and facing each other across the flight path of the ions.

When the ions introduced into the loop orbit enter the deflecting magnetic field created by magnetic field generator, the ions experiences a Lorenz force from the magnetic field because they are charged particles. This force shifts the ions in the axial direction of the electric sector fields. For example, if the magnetic field generator consists of a pair of parallel plate magnetic poles, the strength of the magnetic field between the two magnetic poles is approximately uniform; the strength does not change with the position. Therefore, when ions pass through the magnetic field, the ions always make an approximately equal amount of shift irrespective of their position in the axial direction. Such a shift of the flight path in the axial direction takes place every time the ions pass through the deflecting magnetic field. Therefore, a spiral flight path is eventually formed.

In another mode of the present invention, the magnetic field generator consists of a pair of planer magnetic poles facing each other across the flight path of the ions and being oriented so that their distance from each other uniformly changes according to the position in the axial direction of the electric sector fields.

An increase in the distance between a pair of planar magnetic poles leads to a decrease in the Lorenz force acting on the ions passing through the space between the poles. Therefore, in the above-described mode, the amount of shift of the ions changes according to their position in the axial direction. According to the present mode, it is possible make the ions behave as follows: Immediately after entering the flight path, the ions make a smaller amount of shift in the axial direction so that they can make the largest possible number of turns until they are clearly separated by their mass-to-charge ratios along the flight path; after being separated by mass-to-charge ratios, the ions make a larger amount of shift in the axial direction so that they can quickly reach the detector.

After passing through the deflecting magnetic field, when the ions enter the next electric sector field, they maintain their flight path that has been bent in the axial direction by the deflecting magnetic field. Therefore, the flight path of the ions within the electric sector field is on a plane perpendicular to the axial direction. Since the electric sector field does not converge ions in the axial direction, it may allow the ions having the same mass-to-charge ratio to spread in the axial direction if they fly on a plane oblique to the axial direction within the electric sector field. Therefore, it is preferable to correct the flight path of the ions within the electric sector field so that they fly on a plane perpendicular to the axial direction.

Accordingly, in the time of flight mass spectrometer according to the present invention, the deflecting magnetic field may be provided at each of two or more neighboring pairs of the electric sector fields, where the ion-deflecting direction of one deflecting magnetic field in the axial direction is opposite to that of the deflecting magnetic field neighboring to the aforementioned deflecting magnetic field.

According to this construction, ions that have their paths deflected in an axial direction by a deflecting magnetic field have their paths deflected to the opposite direction by the next deflecting magnetic field. If both deflecting magnetic fields are tuned to produce the same amount of deflection in the axial direction, the flight paths of the ions that have passed through the second deflecting magnetic field are on a plane perpendicular to the axial direction. Thus, at least within the electric sector field located immediately after the second deflecting magnetic field, the ions are prevented from spreading in the axial direction.

In a preferable mode of the time of flight mass spectrometer according to the present invention, the deflecting magnetic field created between a pair of neighboring electric sector fields includes first and second deflecting magnetic fields separately located along the flight path of the ions, and the ion-deflecting directions of the two deflecting magnetic fields in the axial direction are opposite to each other.

According to this construction, ions that have their paths deflected in the axial direction by the first deflecting magnetic field have their paths deflected to the opposite direction by the second deflecting magnetic field. If both deflecting magnetic fields are tuned to produce the same amount of deflection in the axial direction, the flight paths of the ions that have passed through the second deflecting magnetic field are on a plane perpendicular to the axial direction. The real amount of deflection in the axial direction depends on the distance between the exit of the first deflecting magnetic field and the entrance of the second deflecting magnetic field. This construction makes the ions fly on a plane perpendicular to the axial direction within every electric sector field so that the ions are prevented from spreading in the axial direction.

The magnetic field generator may use either permanent magnets or electromagnets. Use of electromagnets enables an arbitrary control of the amount of deflection of the ions per turn by changing the strength of the magnetic field, allowing the measurement condition to be changed according to the purpose of the measurement, the sample type or other factors. For example, the magnetic field may be strengthened when the measurement needs to be quickly performed or weakened when the measurement should be performed for a long period of time to obtain a higher level of mass resolution.

Thus, compared to the aforementioned conventional example, the time of flight mass spectrometer according to the present invention has a simpler mechanism that does not use a large number of electrodes arranged along the axial direction to shift the ions. Despite its simplicity, the structure can produce a uniform magnetic field that causes the ions to make the same amount of shift at every turn. Thus, the performance can be easily achieved as designed. Furthermore, since the plate magnetic poles for creating the deflecting magnetic field is not present to the ion-deflecting direction, it is possible to arbitrarily set the amount of deflection of the ions per turn without being obstructed by magnetic poles or electrodes.

BRIEF DESCRIPTION OF THE DRAWINGS

FIG. 1(*a*) is a plan view of the flight space and FIG. 1(*b*) is a side view of the flight path of the ions within the space between A-A' in (a).

EXPLANATION OF NUMERALS

1 . . . Ion Source
2 . . . Detector
E1, E2 . . . Electric Sector Field
B1, B11, B12 . . . Deflecting Magnetic Field
10 . . . Flight Space
11, 12 . . . Cylindrical Electrode
11*a*, 12*a* . . . Outer Electrode
11*b*, 12*b* . . . Inner Electrode
13 . . . Entrance Gate Electrode
14 . . . Exit Gate Electrode
15, 16, 151, 152 . . . Magnetic Field Generator
15*a*, 15*b*, 15*l*a, 15*b*, 16*a*, 16*b*, 17*a*, 17*b* . . . Plate Electrode

DETAILED DESCRIPTION OF PREFERRED EMBODIMENTS

Figure 1:
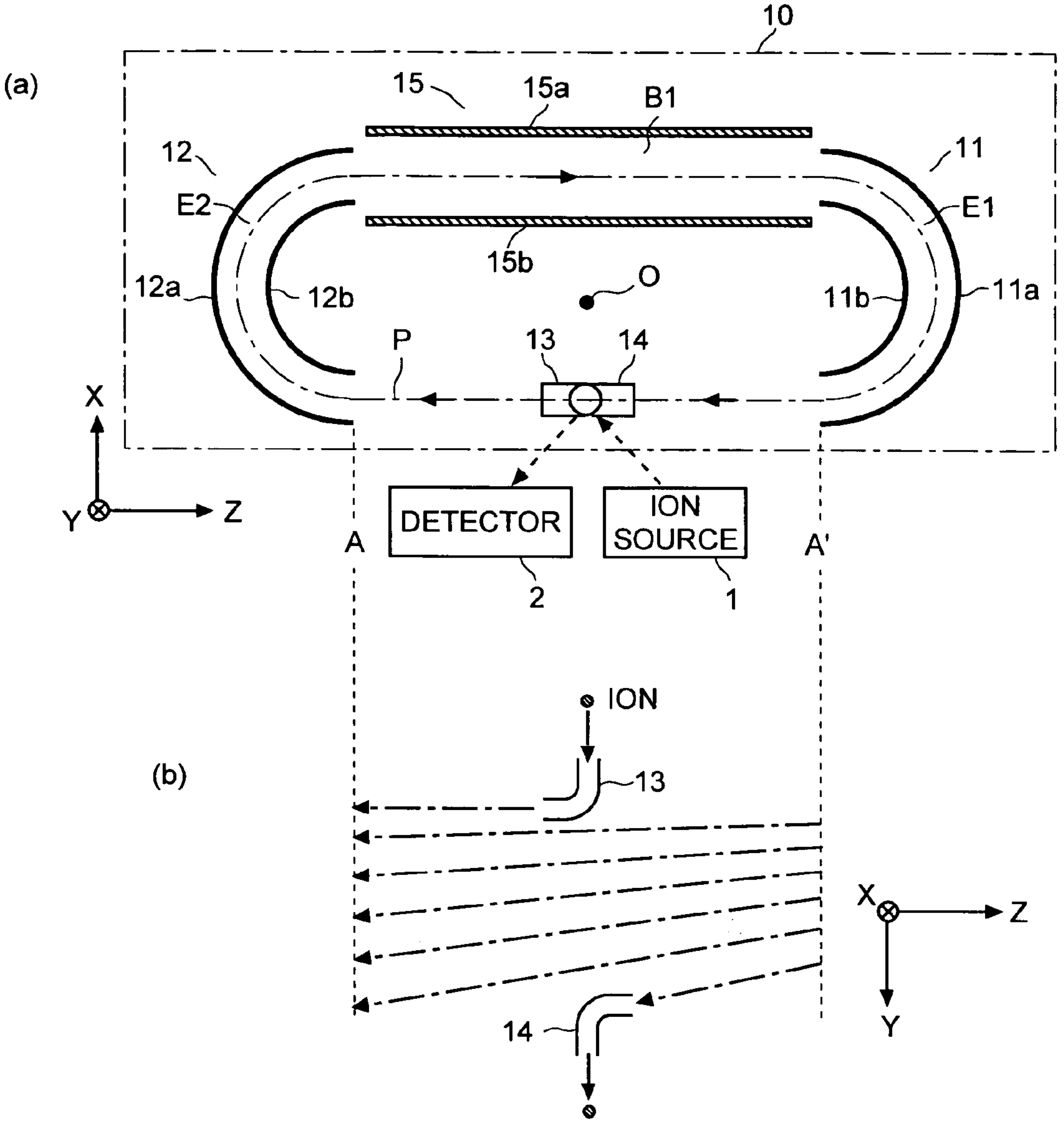
FIG. 1 schematically shows the construction of the main components the first embodiment of the time of flight mass spectrometer according to the present invention, including the flight space.

The first embodiment of the time of flight mass spectrometer (TOFMS) according to the present invention is described with reference to the drawings. FIG. 1 schematically shows the construction of the main components of the TOFMS of the present embodiment, including the flight space. In FIG. 1, (a) is a plan view of the flight space 10 and (b) is a side view of the flight path of the ions within the space between A-A' in (a). For this construction, a three-dimensional orthogonal coordinates system having three axes of X, Y and Z is defined as shown in FIGS. 1(*a*) and 1(*b*).

The TOFMS of the present embodiment includes an ion optics system having a pair of cylindrical electrodes 11 and 12 spaced apart by a predetermined distance along the Z-axis within the flight space 10. The cylindrical electrode 11 (or 12) consists of sector-shaped outer and inner electrodes 11*a* and 11*b* (or 12*a* and 12*b*). These electrodes 11*a*, 11*b*, 12*a* and 12*b* can be created by setting a double-wall cylinder parallel to the Y-axis and splitting it into halves in the Y-direction. A voltage-generating circuit (not shown) applies a predetermined voltage to each of the cylindrical electrodes 11 and 12 to create a electric sector field E1 or E2 within the space between the inner electrode 11*b* or 12*b* and the outer electrode 11*a* or 12*a*. Within the sector-shaped electrode E1 or E2, ions travel along a semicircular path, as shown in FIG. 1(*a*). Within the space between the cylindrical electrodes 11 and 12, the ions follow an approximately straight path without being affected by the electric sector fields E1 and E2. Due to the action of the electric sector fields E1 and E2, the central path of the ions is as indicated by P in FIG. 1(*a*).

The entrance gate electrode 13 for introducing ions into the above flight path and the exit gate electrode 14 for releasing the ions from the flight path are spaced apart in the Y-direction, above and below the flight path of the ions within the space between the cylindrical electrodes 11 and 12. Ions ejected from the ion source 1 are introduced through the entrance gate electrode 13 into the flight path. Ions released from the flight path through the gate electrode 14 are introduced into the detector 2, which produces an electrical signal corresponding to the amount of the ions received.

Figure 2:
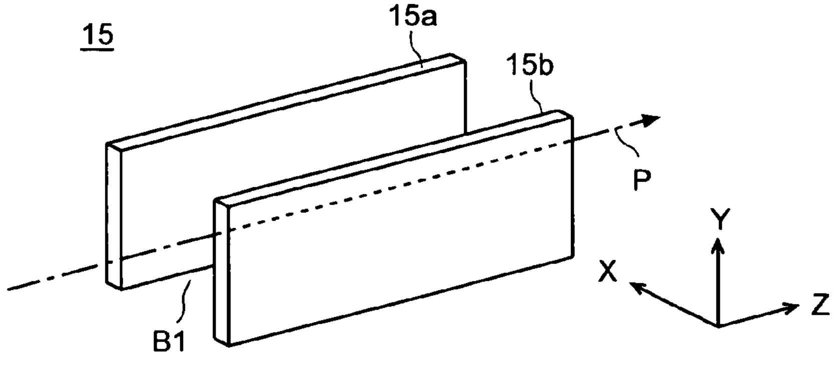
FIG. 2 is a perspective view of the magnetic field generator in FIG. 1.

In the linear section of the flight path between the exit of the cylindrical electrode 12 and the entrance of the cylindrical electrode 11, a magnetic field generator 15 having a parallel pair of planer magnetic poles 15*a* and 15*b* (north and south) is provided. The two magnetic poles, which are spaced apart in the X-direction and facing each other across the central path P of the ions, create a deflecting magnetic field B1 for shifting the ions in the axial direction of the electric sector fields E1 and E2. FIG. 2 is a schematic perspective view of the magnetic field generator 15.

The following description represents how the ions fly within the flight space 10 of the TOFMS of the present embodiment. As shown in FIG. 1(*b*), ions ejected from the ion source 1 enter the entrance gate electrode 13, which redirects the ions to a substantial vertical direction. The redirected ions fly on a plane perpendicular to the Y-axis and enter the electric sector field E2. After passing this field E2, the ions enter the deflecting magnetic field B1, within which the ions behave as follows:

Suppose that a vector within the three-dimensional coordinates system XYZ is represented by adding a bold typeface; for example, the vector of A is represented as A. With the strength of the deflecting magnetic field B1 denoted by B=(Bx, 0, 0), the charge of a flying ion denoted by q, and the speed of the ion denoted by V=(Vx, Vy, Vz), the Lorenz force F that acts on the ion passing through the deflecting magnetic field B1 is given by:

$$F=qV\times B=(0, qVzBx, 0)$$

Figure 3:
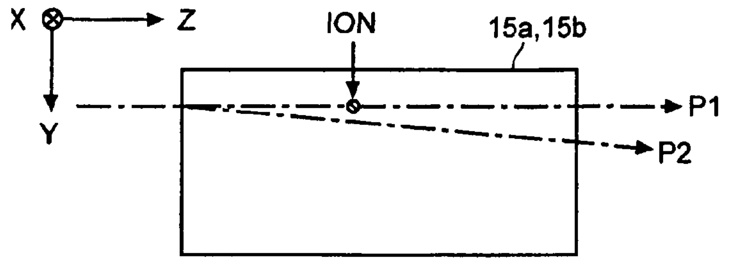
FIG. 3 is a drawing for illustrating the deflection of ions within the deflecting magnetic field.

This means that the ion experiences only the force Fy=qVzBx, which acts in the Y-direction (i.e. the direction of the electric sector fields E1 and E2). Due to this force, the ion that has entered the flight path along the Z-direction follows the path P2 that is bent downwards to the Y-direction, diverting from the path P1 that the ion would follow if there were no such magnetic field, as shown FIG. 3. As a result, at the moment where the ion exits the deflecting magnetic field B, the ion is shifted to the Y-direction by a predetermined distance.

Figure 4:
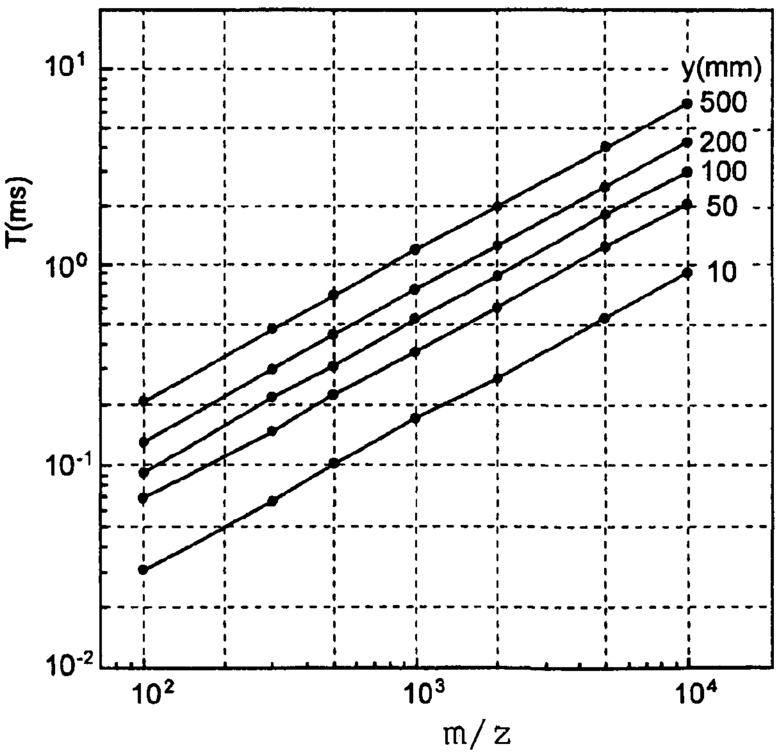
FIG. 4 is a graph showing the result of a computer simulation for determining the relationship between the mass-to-charge ratios of ions and the time required for the ions to reach specified amounts of deflection.

FIG. 4 shows the result of a simulation in which the time T required for an ion to reach predetermined amounts of the Y-directional deflection (y=10, 50, 100, 200 and 500 mm) was calculated for several mass-to-charge ratios (m/z) under the following conditions: the strength of the deflecting magnetic field B1 is 10 Gauss; the magnetic field measures 100 mm in Z-direction and 600 mm in Y-direction; and the initial kinetic energy of the ion is 4.5 eV. As shown in FIG. 4, the time required for the ion to reach a specific amount of deflection y depends on its mass-to-charge ratio. This required time can be controlled through the strength and the length (i.e. the size in Z-direction) of the magnetic field. In the construction of the above embodiment, the length of the magnetic field is firmly defmed by the planer magnetic poles 15*a* and 15*b*. If the planer magnetic poles 15*a* and 15*b* are permanent magnets, the strength of the magnetic field is also fixed, so that the amount of deflection depends on the mass-to-charge-ratio.

While orbiting along the ion path P shown in FIG. 1(*a*) due to the action of the two electric sector fields E1 and E2, the ion is shifted along the Y-direction by an amount corresponding to its mass-to-charge ratio once every turn when it passes through the deflecting magnetic field B1. Thus, the ion draws a spiral whose gradient gradually increases with the number of turns of the ion, as shown in FIG. 1(*b*). Finally, when it reaches the exit gate electrode 14, the ion is released from the ion path P and sent to the detector 2.

As described above, the TOFMS of the present embodiment uses the deflecting magnetic field to shift the ions in the Y-direction to create a spiral flight path, thus enabling the ions to travel over a long distance until they reach the detector. The amount of deflection varies with the mass-to-charge ratio; an ion having a smaller mass-to-charge ratio has a larger deflection. Therefore, an ion having a smaller mass-to-charge ratio makes a smaller number of turns until it reaches the exit gate electrode 14, whereas an ion having a larger mass-to-charge-ratio makes a larger number of turns. The difference in the amount of deflection causes the flight paths of ions having different mass-to-charge ratios to intersect each other. However, even if different ions enter the flight space at the same time, they are not intermixed during the flight because the ion having a smaller mass-to-charge ratio flies faster than the ion having a larger mass to charge ratio. Therefore, it is possible to separately detect the ions having different mass-to-charge ratios on the basis of the time required for each ion to fly from the ion source 1 to the detector 2.

Figure 5:
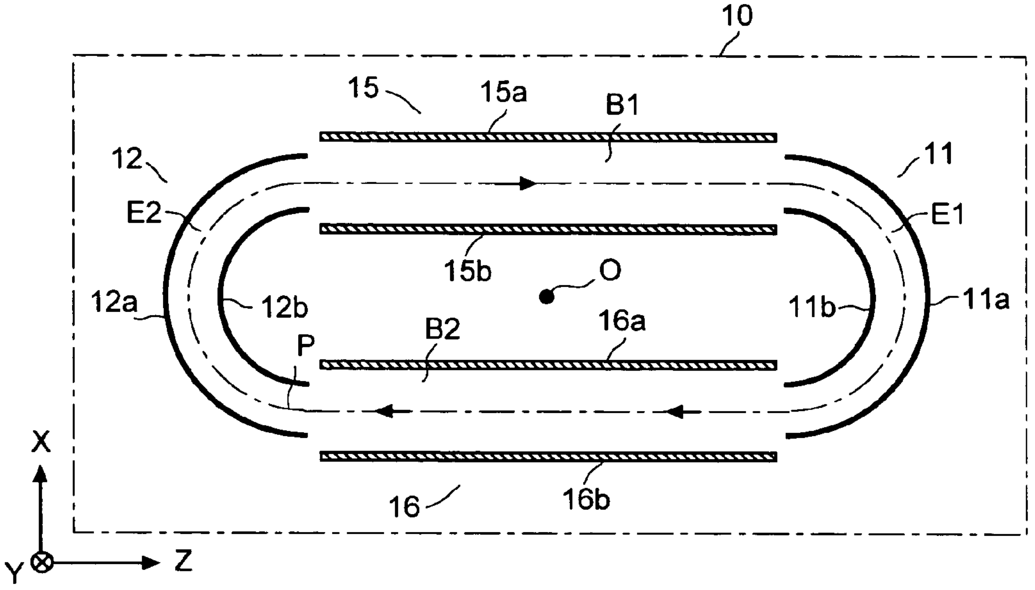
FIG. 5 is a plan view showing the construction of the main components around the flight spaces in the second embodiment of the time of flight mass spectrometer according to the present invention.

FIG. 5 schematically shows the construction of the main components of the TOFMS of another embodiment (the second embodiment), including the flight space. In the present embodiment, the TOFMS has two magnetic field generators: the first magnetic field generator 15 for creating the deflecting magnetic field B1 in the linear section of the flight path between the exit of the cylindrical electrode 12 and the entrance of the cylindrical electrode 11; and the second magnetic field generator 16 for creating another deflecting magnetic field B2 in the linear section of the flight path between the exit of the cylindrical electrode 11 and the entrance of the cylindrical electrode 12. The second magnetic field generator 16 has a parallel pair of planer magnetic poles 16*a* and 16*b* spaced apart in the X-direction and facing each other across the central path P of the ions.

Figure 6:
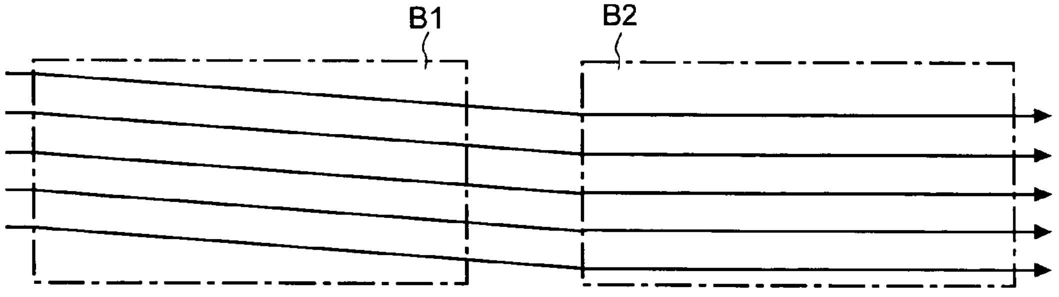
FIG. 6 is a drawing for illustrating the deflection of ions within the deflecting magnetic field in the second embodiment.

The direction of the magnetic field of the deflecting magnetic field B2 created by the second magnetic field generator 16 is opposite to that of the deflecting magnetic field B1 created by the first magnetic field generator 15; the north and south poles are transposed. Accordingly, an ion passing through the deflecting magnetic field B2 experiences a Y-directional Lorenz force whose direction is opposite to that of the force that acts on the ion when it passes through the deflecting magnetic field B1. The two magnetic fields are identical in strength and Z-directional length, so that the absolute value of the amount of deflection is the same in both magnetic fields B1 and B2. Therefore, as shown in FIG. 6, an ion that has been deflected downwards along the Y-direction by a predetermined amount within the deflecting magnetic field B1 is deflected upwards along the Y-direction by the same amount within the deflecting magnetic field B2. As a result, the flight path of the ion is on a plane perpendicular to the Y-axis when the ion exits the deflecting magnetic field B2, and the ion keeps flying on the same plane within the electric sector field E2. Thus, the ion is prevented from spreading in the Y-direction.

Figure 7:
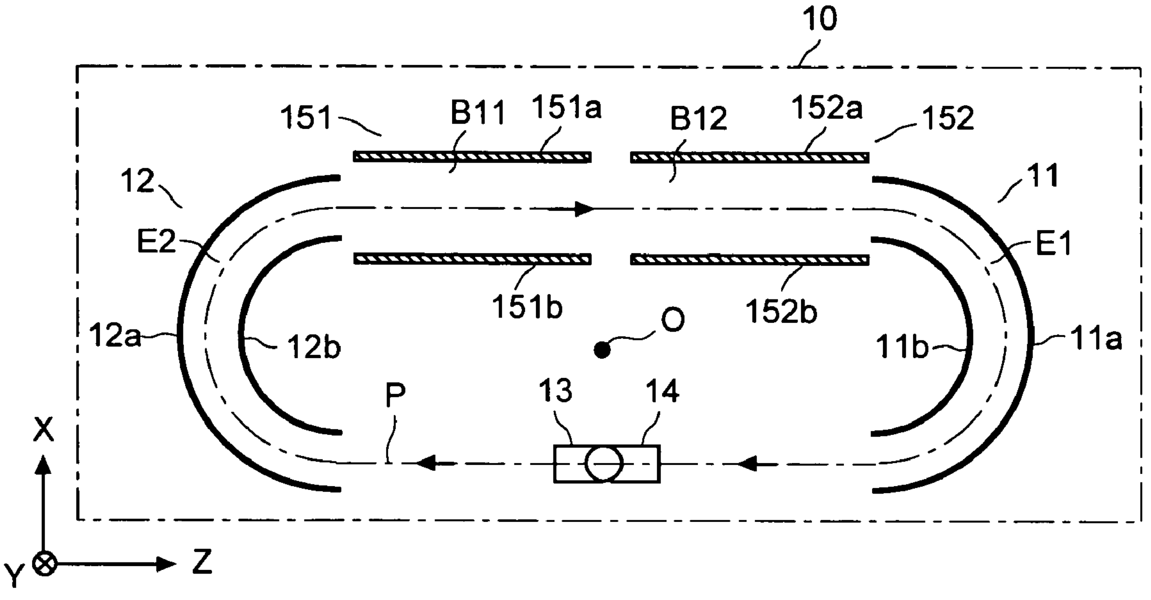
FIG. 7 is a plan view showing the construction of the main components around the flight spaces in the third embodiment of the time of flight mass spectrometer according to the present invention.

In the second embodiment, however, ions having the same mass-to-charge ratio may spread in the Y-direction because they fly on a plane that is not perpendicular but oblique to the Y-axis within the other electric sector field El, while neither the sector-shaped electrode E1 nor E2 is capable of converging the spread ions. To solve this problem, the TOFMS in another embodiment (the third embodiment) has the first and second magnetic field generators 151 and 152 spaced apart in Z-direction in the linear section of the flight path between the exit of the sector-shaped electrode 12 and the entrance of the sector-shaped electrode 11, as shown in FIG. 7. Each of the magnetic field generators 151 and 152 consists of a parallel pair of planer magnetic poles 151*a* and 151*b* or 152*a* and 152*b*.

As in the second embodiment, the first and second magnetic field generators 151 and 152 create the deflecting magnetic fields B11 and B12, respectively, and the direction of Lorenz force that acts on an ion within the deflecting magnetic field B11 is opposite to that of the Lorenz force that acts on the same ion within the deflecting magnetic field B12. The flight path is on a plane perpendicular to the Y-axis when the ion exits the second magnetic field generator 152. However, the third embodiment differs from the second embodiment in that the ion flies on a plane perpendicular to the Y-axis within both the electric sector fields E1 and E2 because both deflecting magnetic fields B11 and B12 are located in the same linear section of the flight path. Thus, the ions are prevented from spreading in the Y-direction. It should be noted that, in the present case, the amount of deflection in the Y-direction per one turn of the ion depends on the distance between the first and second deflecting magnetic fields B11 and B12 as well as the length of each deflecting magnetic field. These parameters should be appropriately determined.

Figure 8:
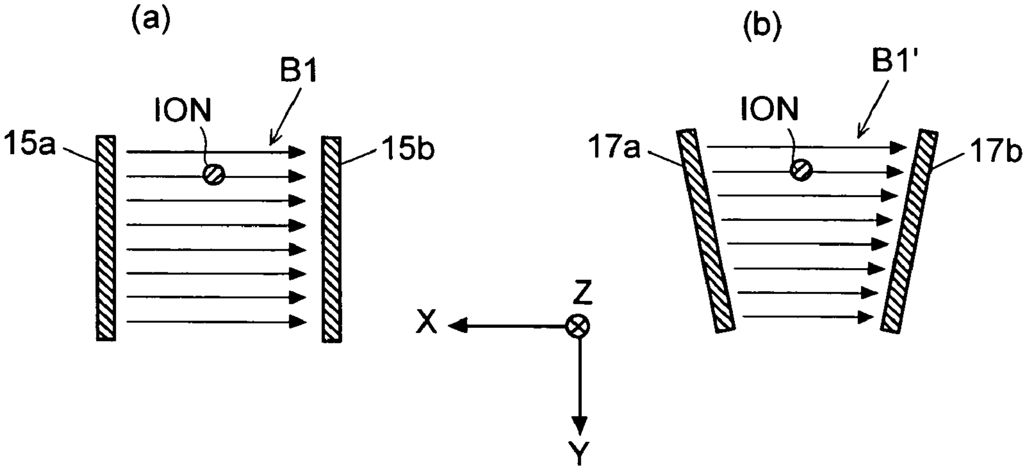
FIG. 8 shows two examples (a) and (b) of the magnetic field generators viewed from the incident direction of the ions.

In the above three embodiments, each magnetic field generator consists of a parallel pair of planer magnetic poles spaced apart along the X-direction. FIG. 8(*a*) is a schematic diagram of this magnetic field generator viewed from the incident direction of the ions. It shows two planer magnetic poles 15*a* and 15*b*, between which a deflecting magnetic field B1 is uniformly distributed along the Y-direction. As long as the deflecting magnetic field B1 is maintained at the same strength, the ions having the same mass-to-charge ratio is shifted by the same amount at any position.

FIG. 8(*b*) shows another possible construction, in which the two planer magnetic poles 17*a* and 17*b* are not parallel to each other; they are arranged so that their distance decreases as the position moves downwards along the deflecting direction of the ions. In general, a decrease in the distance between two magnetic poles strengthens the magnetic field between them. Therefore, in the case of FIG. 8(*b*), the deflecting magnetic field B1' becomes stronger as the position moves downwards along the Y-direction. A stronger magnetic field produces a stronger Lorenz force acting on the ion and an accordingly larger amount of deflection. Therefore, an ion that has entered the flight path undergoes a relatively small amount of deflection, which becomes larger as the flight proceeds. Such a gradual increase in the amount of deflection at every turn causes the ion to behave differently according to the phase of operation: In the initial phase where the ions having different mass-to-charge ratios are not adequately separated, the ions are made to make the largest possible number of turns so as to help the separation of the ions by their mass-to-charge ratios; after the ions have been adequately separated, the amount of deflection is increased so that the ions are promptly brought to the exit gate electrode, thus preventing the measurement time from being unnecessarily long.

Thus, it is possible to intentionally adopt a nonparallel arrangement of the planer magnetic poles. Furthermore, the magnetic poles may have a curved form instead of the planer shape. However, it should be noted that curved magnetic poles create a deflecting magnetic field having a component that is not parallel to the X-axis. This means that the Lorenz force acting on the ions has a component that is not parallel to the Y-axis. This makes the behavior of the ions more complex.

In the embodiments described thus far, the magnetic field generators are assumed to maintain the magnetic field at a fixed strength. Using an electromagnet allows the magnetic field strength to change in a short period of time. As explained earlier, a change in the magnetic field strength leads to a change in the amount of deflection of the ions. This phenomenon opens up new possibilities for the measurement. For example, according to the mass-to-charge ratio of the target ion, the magnetic field strength may be appropriately controlled to optimize the mass-resolution for that ion. If ions having smaller mass-to-charge ratios are not wanted, it is possible to initially strengthen the magnetic field to promptly expel the unwanted ions from the flight path and then weaken the magnetic field to make the desired ions revolve many times so that they can be separated with high mass resolution.

Finally, it should be noted that any of the embodiments described thus far are mere examples and may be changed, modified or expanded in various forms within the spirit and scope of the present invention as specified in the claims.

What is claimed is:

1. A time of flight mass spectrometer having an ion optics system including plural pieces of electric sector fields arranged to form a loop-shaped flight space within which ions can turn multiple times, comprising:

a magnetic field generator for creating a deflecting magnetic field between a pair of neighboring electric sector fields, where the deflecting magnetic field shifts a flight path of the ions in an axial direction of the electric fields when the ions pass through the deflecting magnetic field.

2. The time of flight mass spectrometer according to claim 1, wherein the magnetic field generator consists of a pair of planar magnetic poles arranged parallel to each other and facing each other across the flight path of the ions.

3. The time of flight mass spectrometer according to claim 2 wherein the deflecting magnetic field is provided at each of two or more neighboring pairs of the electric sector fields, and an ion-deflecting direction of one deflecting magnetic field in the axial direction is opposite to that of the deflecting magnetic field neighboring to the aforementioned deflecting magnetic field.

4. The time of flight mass spectrometer according to claim 3, wherein the strength of the magnetic field created by the magnetic field generator is variable.

5. The time of flight mass spectrometer according to claim 2, wherein the deflecting magnetic field created between the pair of neighboring electric sector fields includes first and second deflecting magnetic fields separately located along the flight path of the ions, and ion-deflecting directions of the two deflecting magnetic fields in the axial direction are opposite to each other.

6. The time of flight mass spectrometer according to claim 5, wherein the strength of the magnetic field created by the magnetic field generator is variable.

7. The time of flight mass spectrometer according to claim 2, wherein the strength of the magnetic field created by the magnetic field generator is variable.

8. The time of flight mass spectrometer according to claim 1, wherein the magnetic field generator consists of a pair of planer magnetic poles facing each other across the flight path of the ions and being oriented so that their distance from each other uniformly changes according to a position in the axial direction of the electric sector fields.

9. The time of flight mass spectrometer according to claim 8 wherein the deflecting magnetic field is provided at each of two or more neighboring pairs of the electric sector fields, and an ion-deflecting direction of one deflecting magnetic field in the axial direction is opposite to that of the deflecting magnetic field neighboring to the aforementioned deflecting magnetic field.

10. The time of flight mass spectrometer according to claim 9, wherein the strength of the magnetic field created by the magnetic field generator is variable.

11. The time of flight mass spectrometer according to claim 8, wherein the deflecting magnetic field created between the pair of neighboring electric sector fields includes first and second deflecting magnetic fields separately located along the flight path of the ions, and ion-deflecting directions of the two deflecting magnetic fields in the axial direction are opposite to each other.

12. The time of flight mass spectrometer according to claim 11, wherein the strength of the magnetic field created by the magnetic field generator is variable.

13. The time of flight mass spectrometer according to claim 8, wherein the strength of the magnetic field created by the magnetic field generator is variable.

14. The time of flight mass spectrometer according to claim 1, wherein the deflecting magnetic field is provided at each of two or more neighboring pairs of the electric sector fields, and an ion-deflecting direction of one deflecting magnetic field in the axial direction is opposite to that of the deflecting magnetic field neighboring to the aforementioned deflecting magnetic field.

15. The time of flight mass spectrometer according to claim 14, wherein the strength of the magnetic field created by the magnetic field generator is variable.

16. The time of flight mass spectrometer according to claim 1, wherein the deflecting magnetic field created between the pair of neighboring electric sector fields includes first and second deflecting magnetic fields separately located along the flight path of the ions, and ion-deflecting directions of the two deflecting magnetic fields in the axial direction are opposite to each other.

17. The time of flight mass spectrometer according to claim 16, wherein the strength of the magnetic field created by the magnetic field generator is variable.

18. The time of flight mass spectrometer according to claim 1, wherein the strength of the magnetic field created by the magnetic field generator is variable.

* * * * *